UNITED STATES PATENT OFFICE.

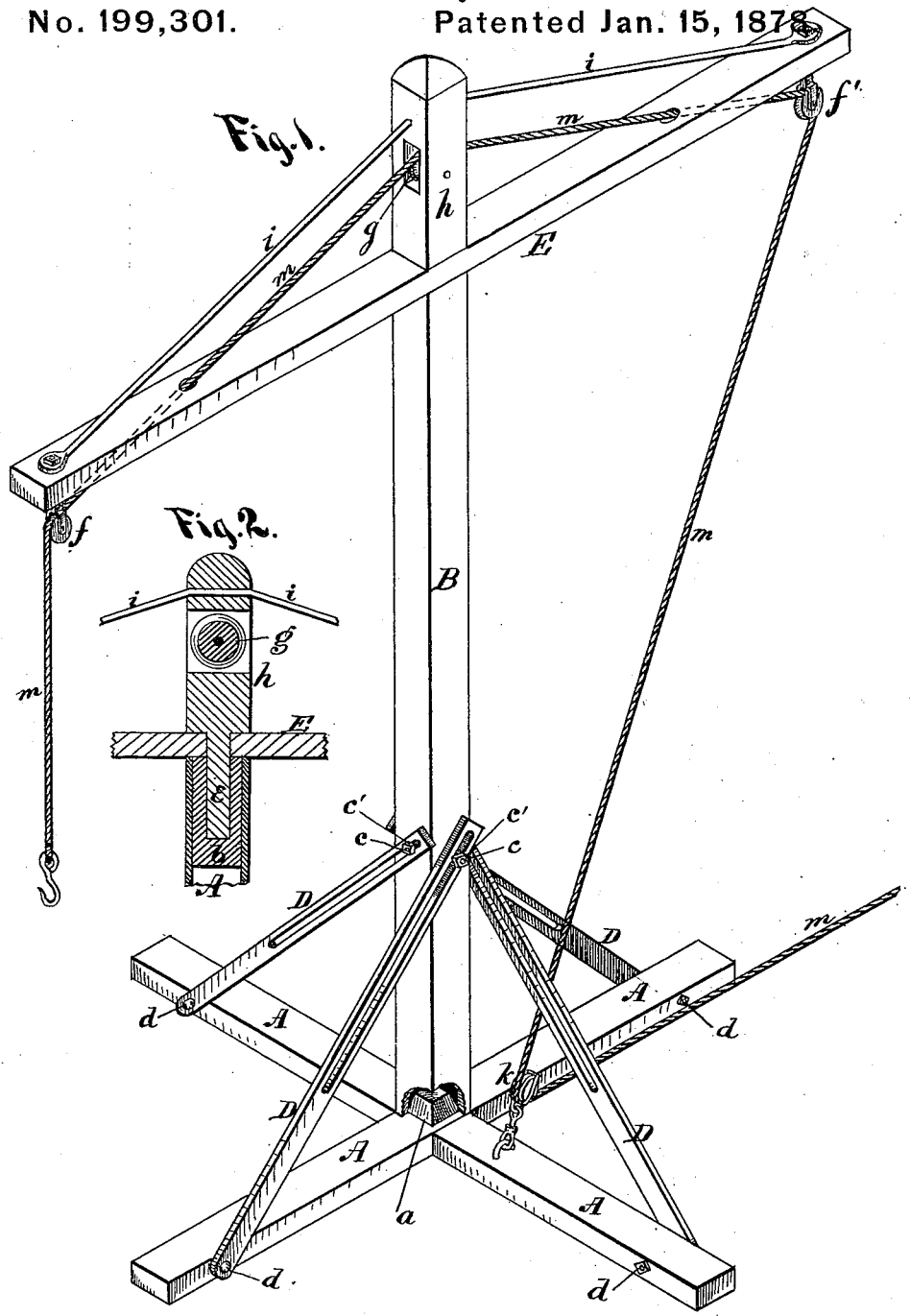

ANDREW J. MARKS, OF BEAVER, PENNSYLVANIA.

IMPROVEMENT IN DERRICKS FOR HAY-STACKERS.

Specification forming part of Letters Patent No. 199,301, dated January 15, 1878; application filed December 18, 1877.

*To all whom it may concern:*

Be it known that I, ANDREW J. MARKS, of Beaver, in the county of Beaver and State of Pennsylvania, have invented certain new and useful Improvements in Hay-Stackers; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to devices for stacking hay—that is, lifting quantities of hay off the wagon, swinging it around to the desired point, and dropping it to place, and for other analogous purposes; and consists in the construction and combination of parts, as hereinafter fully described and claimed, wherein remarkable cheapness, ease of construction, perfection of operation, and adaptability to all kinds of positions are the chief characteristics.

I take two planks or timbers, A A, crossed at right angles and fixed together at their middle, and on these I fix a block, $a$, at their intersection. I then construct of boards or other material a hollow square shaft or column, B, which fits down upon block $a$, and has a solid block, $b$, set into its upper end. Two bolts, $c\ c$, pass at right angles through the shaft B at a few feet from the bottom, having their projecting end or ends threaded for the nuts $c'$. Slotted braces D are loosely pivoted at their lower ends on transverse bolts $d$, passing laterally into or through the base-planks A, as shown, and the bolts $c$ are projected through the slots in braces D.

This construction permits the shaft B to be adjusted to and maintained in vertical position, no matter whether the ground is level or inclined, as the slotted braces allow it to be fixed at any angle to the base, while block $a$ prevents the displacement of the shaft's lower end, acting as a pivotal point therefor.

A cross-beam, E, is swiveled on a pin, $e$, at its middle, turning in a bearing bored vertically into the block $b$. Pulleys $f\ f'$ are respectively attached at or near each end of the beam E at equal distances from its center. Another pulley, $g$, is set in an upright, $h$, which rises from the center of beam E and braces a supporting-rod, $i$, of iron, extending from it down to each end of beam E. The beam E is slotted in line with both pulleys $f\ f'$ from pulley $g$. A rope, $m$, having at its end a hay-fork or other lifting device, passes over pulley $f$, through beam E, over pulley $g$, down through beam E on the other side, over pulley $f'$, thence down to and around a pulley-block, $k$, which can be attached to either of the sides of shaft B at or near its base, or either of the planks A, or to either of the braces D, thence off to one side, where a horse may be hitched to it.

Operation: The load of hay is at one side of the device, and the stack is to be built at the other. The fork is stuck into the hay till a sufficient quantity is secured to it. Then the horse is started. This, of course, lifts the hay; but on account of the lateral position of pulley $k$, the beam E is swung around a quarter-revolution, more or less, according to the position of pulley $k$. A guy-rope may be attached to one end of beam E to lead it to the exact position required. After swinging round, the fork-trigger is sprung and the hay drops to the stack, the beam E swung back, and the operation repeated. The draft being practically a center draft, and the strain on beam E equal at both sides, and it supported by rod $i$, there is little strain on swivel $e$, and hence no danger of breakage.

The base may be made of common plank, the shaft and braces of boards, the beam E of wood, and, but little smithing being required, the whole device can be readily constructed at a cost of a few dollars. It will stand as well on a hill-side as on the level, and requires no shaping or preparation of the ground. Its construction, too, helps its erection.

The base A being placed in position, the shaft B is up-ended as far as practicable, and then the two side braces are placed on it and the nuts tightened, one or both of which may have crank-handles for that purpose. This holds the shaft steady and firm. Then the cross-beam is lifted, with rope $m$ in position, and pin $e$ inserted in block $b$. By now loosening the nuts, and pulling straight outwardly on the rope, (which should be fastened at opposite end of beam E,) the shaft can be easily hoisted to vertical position.

I claim as my invention—

1. The combination of base A A, block $a$, shaft B, slotted and pivoted braces D, bolts $c$, centrally-swiveled beam E, upright $h$, rod $i$, pulleys $f\,f'$ and $g$, and rope $m$, substantially as described.

2. The combination of base-planks A, block $a$, shaft B, bolts $c$, and the slotted and pivoted braces D, substantially as described, whereby an universal adjustment can be effected for the shaft with relation to its base A.

In testimony that I claim the foregoing as my own I affix my signature in presence of two witnesses.

ANDREW J. MARKS.

Witnesses:
THOS. J. McTIGHE,
E. V. McCANDLESS.